April 28, 1953 C. R. BALLARD 2,636,403
BORING TOOL
Filed Aug. 16, 1949
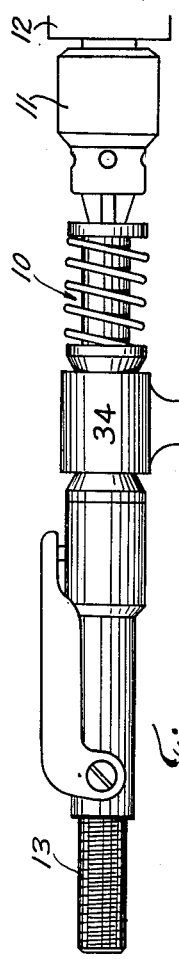
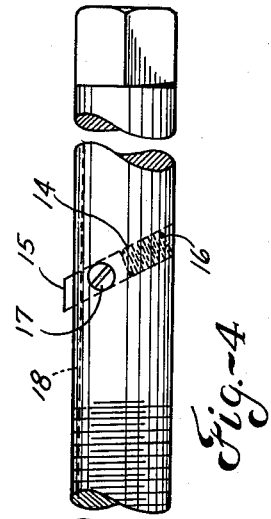
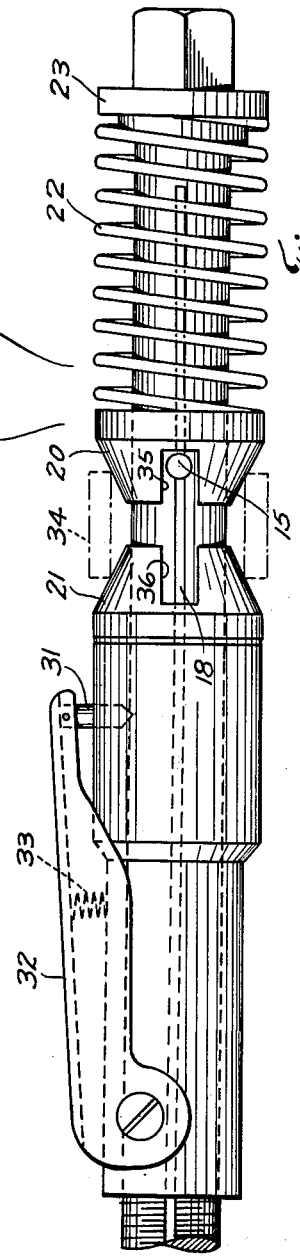
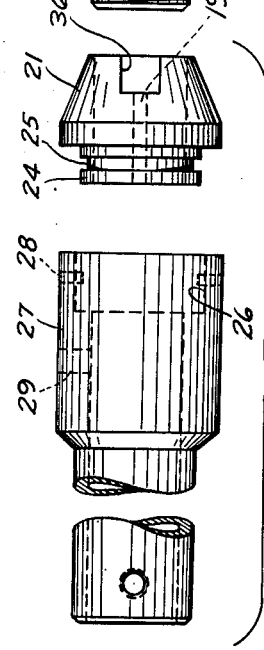
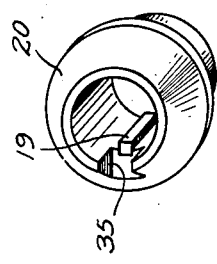
Inventor
Clarence R. Ballard
Tom Walker
Attorney Patented Apr. 28, 1953

2,636,403

UNITED STATES PATENT OFFICE 2,636,403

BORING TOOL

Clarence R. Ballard, Dayton, Ohio

Application August 16, 1949, Serial No. 110,530

11 Claims. (Cl. 77—2)

This invention relates to boring tools and particularly to tools for the boring or reaming of cylindrical work-pieces, for example, the bushings or bearings in automotive connecting rods. It has heretofore been the practice in such work to rigidly mount the bearing or rod in a jig or fixture while a cutter element is driven rotatively and axially through the work. It is difficult in the prior art method of boring, therefore, to avoid the formation of a taper in the work, and, moreover, proper setting up of the job requires considerable time and care and the use of rather extensive equipment. In the latter connection it is frequently the practice to utilize centering cones for initial positioning of the work, which cones are then removed before the boring operation is begun.

The object of the invention is to simplify the construction as well as the means and mode of operation of boring tools as disclosed herein, whereby such tool may not only be economically manufactured but will be more efficient and accurate in use, adaptable to a wide variety of work pieces, having relatively few parts, and be unlikely to get out of repair.

An object of this invention is to simplify the boring of bushings, bearings and the like, while achieving more consistently accurate results.

Another object of the invention is to avoid "belling" or the formation of tapers in the work by an improved construction and mode of operation including a division of the rotary and axial boring movements between the cutter element and the work.

A further object of the invention is to obtain the accurate positioning of the work made possible by centering cones and to retain such accurate and positive positioning during the boring operation.

Still another object of the invention is to obtain close control over the boring operation so that the operation can be discontinued and the parts restored to normal position at any time and by a simple adjustment, as by release of the operator's grip upon the tool.

A further object of the invention is to provide a machine possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In carrying out the above objects, there has been evolved a practical embodiment of the invention wherein a boring tool comprises a rotatable shaft, a pair of opposed centering cones keyed to the shaft and positioning between them a cylindrical work piece in concentric relation to the shaft, a sleeve in loosely surrounding relation to the shaft and abutting one of the centering cones, the other being backed up by a coil spring, screw threads on the shaft, a hand operated plunger carried by the sleeve to engage the screw threads on the shaft and so induce an axial motion of the sleeve, cones and work piece as an assembly against the urging of the coil spring in response to rotation of the shaft, and a cutter element carried by the shaft for rotation in a fixed plane and projecting into cooperative relation with the internal surface of the work piece.

Referring to the accompanying drawing, wherein is found the preferred but obviously not necessarily the only form of embodiment of the invention, Fig. 1 is a view in side elevation of a tool in accordance with the instant invention, showing a means for driving the tool and further showing a connecting rod being held for action of the tool thereupon;

Fig. 2 is an enlarged view similar to Fig. 1 with the connecting rod removed except for a diagrammatic indication thereof;

Fig. 3 is an exploded view in side elevation of parts of the tool;

Fig. 4 is a fragmentary view of the shaft; and

Fig. 5 is a perspective view of one of the centering cones.

Like parts are indicated by similar characters of reference throughout the several views.

Referring to the drawing, according to the illustrative embodiment of the invention the boring tool comprises a rotatable shaft 10 having a squared formation at its right hand or inner end to be received in a chuck, as the chuck 11 shown in Fig. 1 as a part of a power tool 12. The left hand or outer end of the shaft is free and unsupported. Extending from the outer end of the shaft over approximately two-thirds the length thereof is a peripheral screw thread 13. A transverse opening or bore 14 in the shaft receives a cutter element 15 positioned and secured relatively to the shaft by axial and lateral set screws 16 and 17. The cutting edge of the element 15 protrudes a distance above the periphery of shaft 10 determined by the setting of screw 16, while screw 17 locks the cutter element in its desired position of adjustment. The bore 14 is cut angularly in the shaft 10 so as to present a smooth shaft surface diametrically opposite the cutting edge facilitating micrometer measurements of the height of the cutting edge.

In the periphery of the shaft 10 is a longitudinal keyway 18 beginning at the outer end of the shaft and terminating adjacent the inner end thereof. Mounted upon the shaft and formed with a key 19 received in the slot 18 is a first centering cone 20 facing the outer end of the shaft. Similarly mounted upon and keyed to the shaft 10 is a second centering cone 21 oppositely disposed with respect to the first cone 20 and lying between the first cone and the outer end of the shaft.

The cone 20 is resiliently seated upon a coil spring 22 surrounding the shaft 10 and based on a disc 23 pinned to the inner end of the shaft. Cone 21 is formed with a rearwardly projecting extension 24 of reduced diameter having therein an annular groove 25.

The extension 24 is seated in a recess 26 in the end of a sleeve 27, the groove 25 receiving lateral dowel pins 28 to connect sleeve 27 and cone 21 for unitary longitudinal movement while permitting relative rotary movement. The sleeve 27 loosely surmounts the outer end of the shaft 10 and has a lateral opening 29 therein through which a plunger 31 may enter the interior of the sleeve and engage screw thread 13. The plunger 31 is pivotally carried on the inner end of a lever 32 pivotally mounted at its outer end to the exterior of the sleeve 27. A spring 33 urges the lever 32 upward or in a direction to withdraw plunger 31 from screw thread 13, the plunger being thus normally disengaged from the screw thread.

As indicated in Figs. 1 and 2, the centering cones 20 and 21 are constructed and arranged to enter and engage the opposite ends of a cylindrical work piece 34, holding the work piece in concentric relation to the shaft 10. The spring 22 normally positions the assembly comprising cone 20, work piece 34, cone 21 and sleeve 27 in such relation to the cutter element 15 as to place the element in inwardly adjacent relation to the work piece 34, the construction and arrangement being such that the cutter element may work upon the internal surface of the work piece in response to relative axial and rotative movements between the element and work piece.

The cones 20 and 21 are formed with mating slots 35 and 36 defining a passageway through which the cutter element travels thereby allowing a complete traverse of the work piece by the cutter. The relative rotary motion between the cutter and work piece is obtained by fixedly mounting the cutter element in the rotary shaft 10, the cutter rotating therewith in a fixed transverse plane with respect to the shaft. Longitudinal motion of the cutter relative to the work piece is accomplished through a shifting of the centering cones 20 and 21, such movement being produced by engagement of the plunger 31 in the screw thread 13 to induce an axial travel of sleeve 27 and cone 21 toward the inner end of the shaft in response to rotation of the shaft.

A particular application of the boring tool, but not its only use, is in the reboring or reaming of connecting rods, such a device representing the work piece 34 in Fig. 1 and there shown as being acted upon by the tool. In the use of the tool, the sleeve assembly comprising cone 21, sleeve 27, plunger 31 and lever 32 is removed from shaft 10 and the connecting rod or other piece to be bored, slipped on the shaft and brought into engagement with the cone 20. The sleeve assembly then is remounted on the shaft in following relation to the work piece, the cone 21 being moved to engage the work piece in conjunction with cone 20 substantially as shown in Fig. 2. While the connecting rod is held as shown in Fig. 1 to inhibit rotation thereof with the centering cones, rotary motion of the shaft 10 is initiated through the power tool 12 and chuck 11. The sleeve 27 and lever 32 are designed to be grasped in the hand of an operator, who, after rotation of shaft 10 is initiated, compresses lever 32 upon sleeve 27 to engage plunger 31 in the screw thread 13. Thereupon continued rotary motion of the shaft produces an axial movement of sleeve 27 and cone 21 to initially effect a firm clamping engagement and positioning of the work piece 34 between the cones 20 and 21. Continued axial movement of the sleeve assembly causes the work piece and cone 20 to move inwardly along the shaft against the resilient resistance of spring 22 which is compressed by such motion. The work piece 34 is thereby caused to traverse the rotating cutter element 15, the combination of rotary and axial movements serving to bore or ream the work piece in the desired manner.

The cutting action is under the close control of the operator who can interrupt such action at any time by releasing his grip on lever 32. Upon release of the lever 32, the plunger 31 is withdrawn by spring 33 from engagement with screw thread 13. Movement of the sleeve and cone assembly inwardly along the shaft is accordingly discontinued, the parts being restored to normal starting position as shown in Fig. 2, under influence of spring 22.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. In a boring tool having a rotatable shaft, opposed centering cones mounted on said shaft for rotary motion therewith and for axial motion relative thereto, said cones being arranged to engage and position an intermediate cylindrical work piece in concentric relation to said shaft, a cutter element carried by said shaft and engageable with the internal surface of the work piece, and means for moving said centering cones axially to shift the work piece relatively to the cutter element.

2. In a boring tool having a rotatable shaft, means for holding a cylindrical work piece in concentric relation to said shaft, a cutter element carried by said shaft and engageable with the internal surface of said work piece, and means for moving said holding means axially of the shaft to shift the work piece in a longitudinal direction relative to the cutter element.

3. A boring tool, including a cutter element rotatable in a fixed plane, longitudinally shiftable means for holding a cylindrical work piece in concentric relation to said cutter element, and means for simultaneously effecting rotation of said cutter element and longitudinal shifting motion of said holding means relative thereto.

4. A boring tool, including a rotatable shaft, means for holding a cylindrical work piece in concentric relation to said shaft, a cutter element carried by said shaft and engageable with the internal surface of said work piece, and means selectively responsive to rotation of said shaft for moving said holding means axially of the shaft in accompaniment with rotation of said cutter element.

5. A boring tool, including a rotatable shaft, means for holding a cylindrical work piece in concentric relation to said shaft, a cutter element carried by said shaft and engageable with the internal surface of said work piece, a sleeve in loosely surrounding relation to said shaft and abutting said holding means, screw threads on said shaft underlying said sleeve, and means carried by said sleeve selectively engageable with said screw threads to effect an axial movement of said sleeve and holding means in response to rotation of said shaft.

6. A boring tool, including a rotatable shaft, opposed centering cones mounted on said shaft for rotary motion therewith and for axial motion relative thereto, said cones being arranged to engage and position an intermediate cylindrical work piece in concentric relation to said shaft, a cutter element carried by said shaft and engageable with the internal surface of the work piece, and means responsive to rotation of said shaft to move said centering cones axially of said shaft to shift the work piece relative to the cutter element.

7. A boring tool, including a rotatable shaft, opposed centering cones mounted on said shaft for rotary motion therewith and for axial motion relative thereto, said cones being arranged to engage and position a cylindrical work piece in concentric relation to said shaft, a cutter element transversely mounted in said shaft to protrude a short distance above the periphery thereof, mating longitudinal slots in said cones defining a passage for the relative longitudinal movement of said cutter element and said cones, means responsive to rotation of said shaft to shift said cones axially of said shaft to carry the work piece longitudinally thereof in accompaniment with rotation of the cutter element, and spring means for initially positioning said centering cones and to provide a force for return axial motion thereof.

8. A boring tool, including a rotatable shaft, opposed centering cones keyed to said shaft and arranged to engage and position an intermediate cylindrical work piece in concentric relation to said shaft, a coil spring providing a resilient seat for one of said cones, a sleeve loosely mounted on said shaft and abutting the other of said cones, longitudinal motion of said sleeve serving to shift the assembly comprising the cones and work piece axially of the shaft against the resilient resistance of said spring, selectively operable means for producing progressive longitudinal motion of said sleeve in response to rotation of said shaft, and a cutter element carried by said shaft to protrude radially into cooperative relation with the internal surface of the work piece.

9. A boring tool according to claim 8, characterized in that said selectively operable means includes a screw threaded periphery on said shaft and a plunger mounted in said sleeve for radial motion into engagement with said screw threaded periphery.

10. A boring tool including a rotatable shaft presenting a squared inner end for cooperation with rotary driving means and further presenting a screw threaded periphery extending from the outer end over a part of the length thereof, a first centering cone keyed to said shaft and facing said outer end, said cone providing a seat for a cylindrical work piece slipped over the outer end of said shaft, a coil spring backing for said first cone, a sleeve assembly slipped over the outer end of said shaft in following relation to the work piece and including a second cone facing the first and keyed to said shaft and further including a sleeve loosely surmounting said shaft and connected to said second cone for unitary longitudinal and relative rotational motions, a plunger radially mounted in said sleeve to be manually pressed into cooperative engagement with the screw threaded periphery of said shaft whereby rotary motion of said shaft produces an axial travel of said sleeve assembly toward said first cone to clamp the work piece between said cones in concentric relation to said shaft, continued travel serving to advance said cones and the work piece as a unit toward the inner end of said shaft, and a cutter element carried by said shaft for rotation therewith and protruding radially for cooperative engagement with the internal surface of the work piece.

11. A boring tool according to claim 10, characterized by mating slots in said first and second cones defining a longitudinal passageway into which said cutter element projects.

CLARENCE R. BALLARD.

References Cited in the file of this patent

UNITED STATES PATENTS

| Number | Name | Date |
|---|---|---|
| 1,376,451 | Martell | May 3, 1921 |
| 1,521,751 | Campbell | Jan. 6, 1925 |
| 2,091,628 | Carlson | Aug. 31, 1937 |
| 2,252,121 | Fuglie | Aug. 12, 1941 |

FOREIGN PATENTS

| Number | Country | Date |
|---|---|---|
| 310,188 | Great Britain | Apr. 25, 1929 |